(12) United States Patent
Rhee

(10) Patent No.: US 10,794,492 B2
(45) Date of Patent: Oct. 6, 2020

(54) SEALING DEVICE FOR DRIVE SHAFT

(71) Applicant: SEALINK CORP., Seoul (KR)

(72) Inventor: Hee Jang Rhee, Gyeonggi-do (KR)

(73) Assignee: SEALINK CORP., Seoul (KR)

( * ) Notice: Subject to any disclaimer, the term of this patent is extended or adjusted under 35 U.S.C. 154(b) by 0 days.

(21) Appl. No.: 15/638,116

(22) Filed: Jun. 29, 2017

(65) Prior Publication Data

US 2017/0299061 A1 Oct. 19, 2017

Related U.S. Application Data

(63) Continuation of application No. PCT/KR2015/014431, filed on Dec. 29, 2015.

(30) Foreign Application Priority Data

Dec. 29, 2014 (KR) .......................... 10-2014-0192114
Dec. 29, 2014 (KR) .......................... 10-2014-0192118

(51) Int. Cl.
*F16J 15/3268* (2016.01)
*F16J 15/16* (2006.01)
*F16J 15/00* (2006.01)
*F16J 15/3228* (2016.01)
*B63H 23/32* (2006.01)

(52) U.S. Cl.
CPC .......... *F16J 15/3268* (2013.01); *F16J 15/004* (2013.01); *F16J 15/16* (2013.01); *F16J 15/3228* (2013.01); *B63H 2023/327* (2013.01)

(58) Field of Classification Search
CPC ........ F16J 15/002; F16J 15/004; F16J 15/062; F16J 15/322; F16J 15/3268; F16J 15/3228; B63H 2023/327
See application file for complete search history.

(56) References Cited

U.S. PATENT DOCUMENTS 3,434,727 A * 3/1969 Kollenberger Walter ................... F16J 15/3268 277/577
3,773,336 A * 11/1973 Walker ................... B63H 23/36 277/551
4,174,672 A * 11/1979 Cox ..................... B63H 23/321 114/57

(Continued)

FOREIGN PATENT DOCUMENTS

JP H11512805 A 11/1999
JP 2004028164 A 1/2004

*Primary Examiner* — Nicholas L Foster
(74) *Attorney, Agent, or Firm* — Thorpe North & Western; Todd B. Alder

(57) ABSTRACT

A sealing device for a drive shaft is disclosed and described. The sealing device for a drive shaft comprises a housing disposed to surround the drive shaft between the inner space and the outer space, a plurality of sealing members axially separated from each other between the housing and the drive shaft to seal between the housing and the drive shaft, fixing ring members interposed between the plurality of sealing members to maintain the separation distance between the sealing members, and a fixing member secured to the housing to apply an axial pressure to the plurality of sealing members and fixing ring members, wherein a concave-convex section is formed on at least one of the close surfaces of the fixing ring member and the sealing member, which face each other.

8 Claims, 15 Drawing Sheets

(56) References Cited

U.S. PATENT DOCUMENTS

| | | | | |
|---|---|---|---|---|
| 4,984,812 | A * | 1/1991 | Wada | F02G 1/0535 |
| | | | | 277/560 |
| 5,411,273 | A * | 5/1995 | Pietsch | F16J 15/3216 |
| | | | | 277/309 |
| 6,164,660 | A * | 12/2000 | Goodman | F16J 15/3228 |
| | | | | 277/309 |
| 6,231,048 | B1 * | 5/2001 | McAnally, Jr. | F16J 15/3228 |
| | | | | 277/370 |
| 8,256,772 | B2 * | 9/2012 | Itadani | F16J 15/322 |
| | | | | 277/353 |
| 8,348,281 | B2 * | 1/2013 | Yoshida | B63H 23/321 |
| | | | | 277/560 |
| 8,851,480 | B2 * | 10/2014 | Oiyama | F16J 15/3268 |
| | | | | 277/551 |
| 9,845,881 | B2 * | 12/2017 | Fujii | F16J 15/322 |
| 2001/0030396 | A1 | 10/2001 | Pecht et al. | |
| 2004/0227302 | A1 | 11/2004 | Burdick et al. | |
| 2005/0026706 | A1 | 2/2005 | Kashiwagi et al. | |
| 2005/0151322 | A1 * | 7/2005 | Kobayashi | F16J 15/3228 |
| | | | | 277/309 |
| 2006/0208428 | A1 * | 9/2006 | Oiyama | F16J 15/3216 |
| | | | | 277/551 |
| 2008/0061514 | A1 | 3/2008 | Suzuki | |
| 2011/0215536 | A1 * | 9/2011 | Itadani | F16J 15/322 |
| | | | | 277/562 |
| 2011/0304102 | A1 * | 12/2011 | Yoshida | B63H 23/321 |
| | | | | 277/549 |
| 2012/0169015 | A1 * | 7/2012 | Oiyama | F16J 15/3228 |
| | | | | 277/562 |
| 2013/0228978 | A1 * | 9/2013 | Nakazono | F16J 15/324 |
| | | | | 277/562 |
| 2015/0337963 | A1 * | 11/2015 | Fujii | F16J 15/322 |
| | | | | 277/573 |
| 2017/0175898 | A1 * | 6/2017 | Yoshino | F16J 15/3216 |

* cited by examiner ness of the sealing device of this type has considerably increased.

SEALING DEVICE FOR DRIVE SHAFT

CROSS-REFERENCE TO RELATED APPLICATIONS

This application is a continuation of international Application No. PCT/KR2015/014431, filed on Dec. 29, 2015, which claims the benefit of Korean Patent Application No. 10-2014-0192114, filed on Dec. 29, 2014 and Korean Patent Application No. 10-2014-0192118, filed Dec. 29, 2014, each of which is incorporated herein by reference.

TECHNICAL FIELD

Example embodiments relate to a sealing device for a drive shaft that may detect a leakage, and more particularly, to a sealing device for a drive shaft that may firmly fix a sealing member to prevent an arbitrary movement of the sealing member and also improve a sealing performance, and a sealing device for a drive shaft that may verify whether a leak detection unit operates normally to detect a leakage of a sealing member.

BACKGROUND

In general, a machine, for example, a gear box, a chemical pump, an agitator, a mixer, a reactor, a transmission, a dryer, and a compressor, includes a drive shaft, and also a rotary sealing device installed based on the drive shaft to prevent a leakage along the drive shaft.

Such a rotary sealing device is classified into a lip seal type, a mechanical seal type, and a radial shaft seal type, based on a type of a sealing member.

For example, Korean Patent Registration No. 10-0356502 entitled "Sealing Devices for Axis of Rotation Material" published on Aug. 17, 2001, discloses a lip seal-type rotary sealing device, and Korean Patent Publication No. 10-2006-0097034 entitled "Mechanical Seal Apparatus Utilizing Mechanical Seal" published on Sep. 13, 2006, discloses a mechanical seal-type rotary sealing device.

DETAILED DESCRIPTION

In general, a mechanical seal-type rotary sealing device may be available even in an extreme environment, and advantageous to use in terms of safety and sealability. However, the sealing device of such a type may be complex in a structure and include many components. In addition, it may not be easy to maintain and repair the sealing device, and it may cost a great amount of money to manufacture the sealing device of this type.

In contrast, a lip seal-type rotary sealing device may be simple in a structure, and it may be easy to maintain and repair the sealing device and also cost a relatively small amount of money to manufacture the sealing device of such a type. However, the sealing device of this type may be less used compared to the mechanical seal-type sealing device due to a lower level of durability, sealability, and safely than the mechanical seal-type sealing device. Recently, improvements of a material and a structure of a lip seal-type sealing member have been made, and the number of fields to which the lip seal-type rotary sealing device is applicable has been increasing accordingly.

Figure 1:
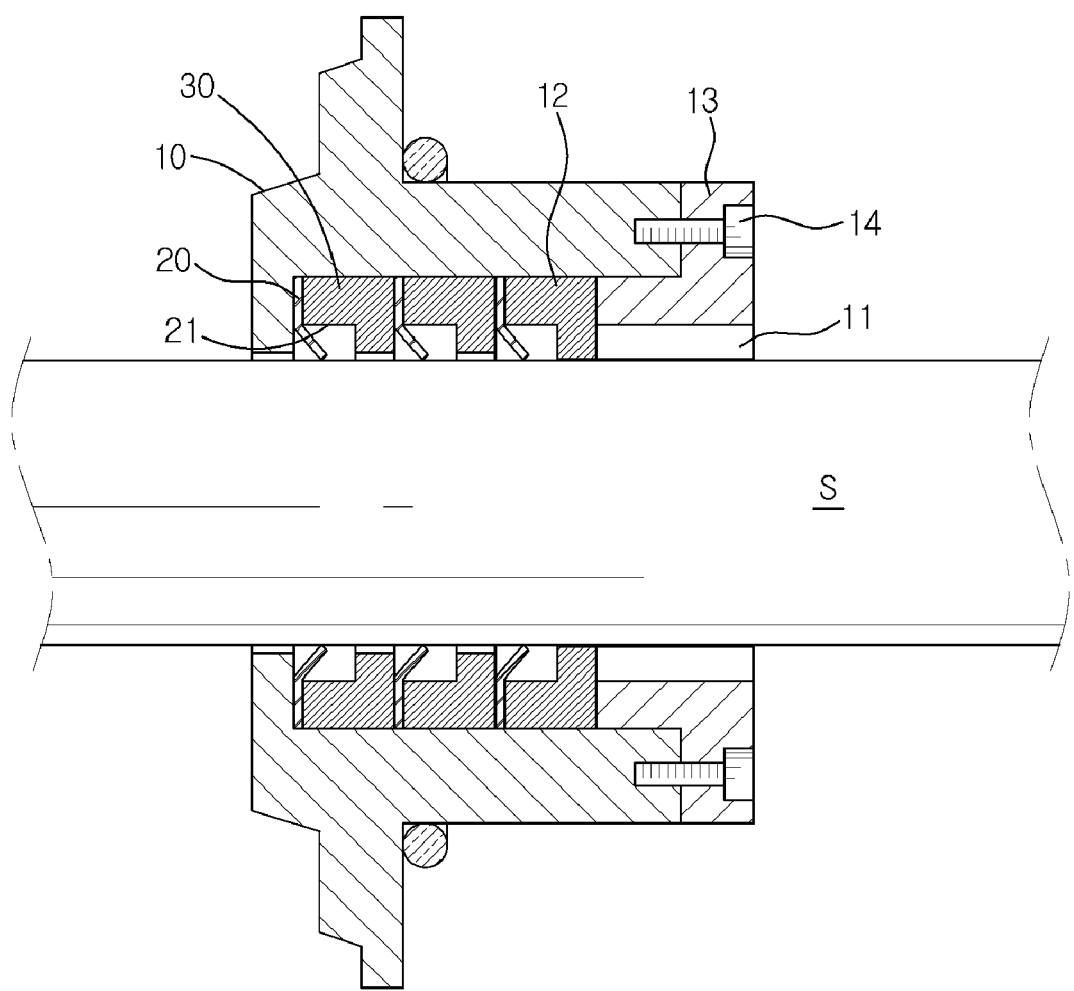
FIG. 1 is a cross-sectional view of a prior art lip seal-type rotary sealing device according to related arts.

As illustrated in FIG. 1, an existing lip seal-type rotary sealing device includes a housing 10 disposed to surround or cover a drive shaft S, a sealing member 20 provided as a plurality of sealing members that is inserted in the housing 10 to be sealed between the housing 10 and the drive shaft S, and a fixing ring member 30 configured to fix and support the sealing member 20 to maintain an interval between the sealing members 20.

The housing 10 includes a shaft hole 11 through which the drive shaft S is inserted, an installation groove 12 into which the sealing member 20 and the fixing ring member 30 are inserted, a fixing ring portion 13 configured to press and fix the sealing member 20 and the fixing ring member 30 in an axial direction, and a bolt 14 configured to fix the fixing ring portion 13 to the housing 10.

The sealing member 20 comes into contact with the drive shaft S to be sealed between the housing 10 and the drive shaft S, and a bent portion 21 is formed in an inner circumferential portion in one direction at a predetermined angle. The bent portion 21 is disposed in a direction opposite to a flow of a fluid such that the bent portion 21 is more closely attached to the drive shaft S in response to an increase in a pressure of the fluid.

The sealing member 20 of a lip seal type may be manufactured using such a material as polytetrafluoroethylene (PTFE), PTFE+carbon, PTFE+graphite, PTFE+carbon+ graphite. PTFE+polyimide, PTFE polyimide+graphite, and PTFE+polyimide+carbon.

The fixing ring member 30 includes a groove portion in which the bent portion 21 is disposed in one side of an inner circumference.

However, in the existing lip seal-type rotary sealing device, a gap may be easily generated between the sealing member 20 and the fixing ring member 30 due to a rotational force and a vibration transmitted to the sealing member 20 through the drive shaft S, and a fluid may leak through such a gap between the sealing member 20 and the fixing ring member 30 to possibly cause huge losses of both life and property.

In addition, since severe personal injuries and property damage may occur due to a leakage accident in a technical field using such a rotary sealing device, it may be important to detect a leak in the rotary sealing device more rapidly and accurately, and also important to determine when to replace the rotary sealing device.

Recently, developments have been made to a rotary sealing device by installing a leak detection unit or sensor configured to detect a leak between sealing members.

To detect whether such a leak detection unit installed in the existing rotary sealing device operates normally, the rotary sealing device may need to be disassembled to remove a sealing member disposed in front of the leak detection unit, or the sealing member provided in the rotary sealing device may need to be destroyed instead of disassembling the rotary sealing device, and the rotary sealing device may then need to be installed in a test device and supply a target fluid to the leak detection unit.

However, such a process may not enable a full inspection because a sealing module needs to be disassembled and the sealing member needs to be damaged. Thus, inspections may need to be performed depending on a sampling test that is performed using a sample extracted at random.

Example embodiments provide a sealing device for a drive shaft to resolve such issues described above, and prevent an arbitrary movement of a sealing member by firmly fixing the sealing member and improve sealability or sealing performance accordingly.

Example embodiments also provide a sealing device for a drive shaft to simply verify whether a leak detection unit operates normally or not, and also enable a full inspection to prevent casualties and property losses that may be caused by a leakage accident.

According to example embodiments, there is provided a sealing device for a drive shaft, the sealing device including a housing disposed to cover the drive shaft between an internal space and an external space, a sealing member provided as a plurality of sealing members disposed separately from each other between the housing and the drive shaft in an axial direction to be sealed between the housing and the drive shaft, a fixing ring member interposed between the plurality of sealing members to maintain an interval between the plurality of sealing members, and a fixing member to be fixed to the housing to apply an axial pressure to the plurality of sealing members and the fixing ring member A concavo-convex portion may be formed on at least one of close surfaces from which the fixing ring member and the sealing member face each other.

The concavo-convex portion may include a pressurizer of which a rear end portion is supported by at least one of the fixing ring member or the sealing member, and a front end portion is disposed to face the other one of the fixing ring member and the sealing member.

The at least one of the fixing ring member or the sealing member by which the rear end portion of the pressurizer is supported may include a concavo-convex groove to accommodate the rear end portion of the pressurizer.

The concavo-convex portion may include an elastic member disposed in the concavo-convex groove to elastically support the rear end portion of the pressurizer.

The pressurizer may be integrated with the at least one of the fixing ring member or the sealing member by which the rear end portion of the pressurizer is supported to be an integral form.

The concavo-convex portion may be extended in a direction crossing a rotation direction of the drive shaft.

The concavo-convex portion may be provided as a plurality of concavo-convex portions disposed separately from each other in a circumferential direction.

The sealing device may further include a closing member interposed in at least one of a surface on which the fixing ring member and the sealing member face each other or a surface on which the fixing ring member and the housing face each other.

The closing member may be provided in a ring type.

A seating groove may be formed at a position corresponding to the closing member of the fixing ring member to accommodate a portion of the closing member.

According to example embodiments, there is provided a sealing device for a drive shaft, the sealing device having a leak detection function, the sealing device including a housing disposed to cover the drive shaft between an internal space and an external space, a sealing member provided as a plurality of sealing members disposed separately from each other between the housing and the drive shaft in an axial direction to be sealed between the housing and the drive shaft, and a leak detection unit disposed in a closed space formed between the sealing members to detect a leak through the sealing member. The housing may include a bypass passage connecting the internal space and the closed space in which the leak detection unit is disposed.

The bypass passage may include a first passage connecting the internal space and an outer circumferential surface of the housing, a second passage connecting the closed space in which the leak detection unit is disposed and the outer circumferential surface of the housing, a third passage connecting the first passage and the second passage, and an opening and closing member installed in any one of the first passage, the second passage, and the third passage and configured to selectively open and close the passage.

A connector may be detachably connected to each of open portions of the first passage and the second passage and both end portions of the third passage.

The leak detection unit may be disposed in at least two closed spaces among the closed space provided as a plurality of closed spaces, and the bypass passage provided as a plurality of bypass passages may connect the internal space and each of the closed spaces in which the leak detection unit is disposed.

The bypass passages connecting the internal space and the leak detection unit may be disposed separately from each other in a circumferential direction so as not to overlap each other.

The closed space may be provided as a plurality of closed spaces, and the bypass passage may be provided as a plurality of bypass passages to respectively connect the internal space and closed spaces in which the leak detection unit is disposed among the closed spaces.

According to example embodiments, there is provided a sealing device for a drive shaft, the sealing device having a leak detection function, the sealing device including a housing disposed to cover the drive shaft between an internal space and an external space, a sealing member provided as a plurality of sealing members disposed separately from each other between the housing and the drive shaft in an axial direction to be sealed between the housing and the drive shaft, and a leak detection unit disposed in at least one of closed spaces formed between the sealing members to detect a leak through the sealing member. The housing may include a first passage connecting the internal space and an outer circumferential surface of the housing and a second passage connecting the at least one closed space and the outer circumferential surface of the housing. The first passage and the second passage may includes a third passage connecting the first passage and the second passage or a closing cap configured to close the first passage and the second passage.

Here, at least one of the first passage, the second passage, or the third passage may include an opening and closing member configured to selectively open or close the passage.

A connector may be detachably connected to open portions of the first passage and the second passage and both end portions of the third passage.

The sealing device may further include a fixing ring member interposed between the sealing members to maintain an interval between the sealing members.

In addition, an extended space may be formed between an inner circumferential surface of the housing and an outer circumferential surface of the fixing ring member.

The extended space may include a ring-type concavo-convex groove formed on at least one of the inner circumferential surface of the housing or the outer circumferential surface of the fixing ring member.

The extended space may include a ring-type closing member disposed on each of both sides of the outer circumferential surface of the fixing ring member to be closely attached to the inner circumferential surface of the housing and the outer circumferential surface of the fixing ring member.

According to example embodiments, a sealing device for a drive shaft may verify whether a leak detection unit operates normally using a bypass passage that bypasses a sealing member, and also enable a full inspection to prevent losses of both life and property that may be caused by a leakage accident.

According to example embodiments, a sealing device for a drive shaft may firmly fix a sealing member to prevent a movement of the sealing member, and also improve sealability or sealing performance.

Prior to descriptions of various example embodiments herein, elements having the same configuration are denoted by the same reference numerals throughout based on the reference numerals used in describing a first example embodiment. Other configurations different from the configurations described in the first example embodiment are also described with reference to other example embodiments herein.

Hereinafter, a sealing device for a drive shaft according to the first example embodiment will be described in detail with reference to the accompanying drawings.

Figure 2:
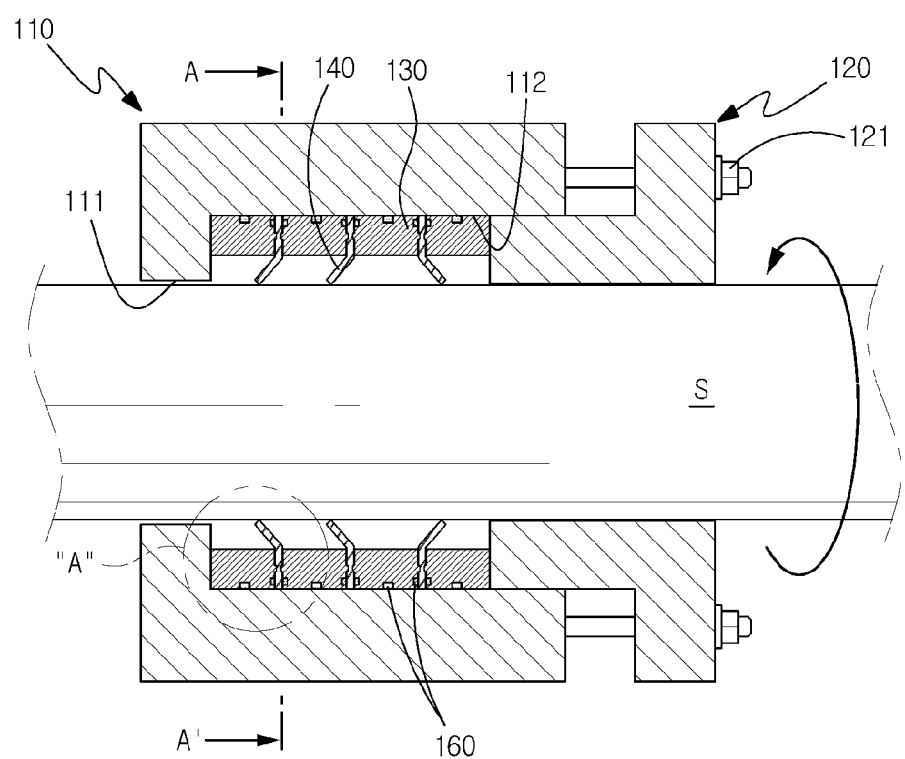
FIG. 2 is a cross-sectional view of a sealing device for a drive shaft according to a first example embodiment.
Figure 3:
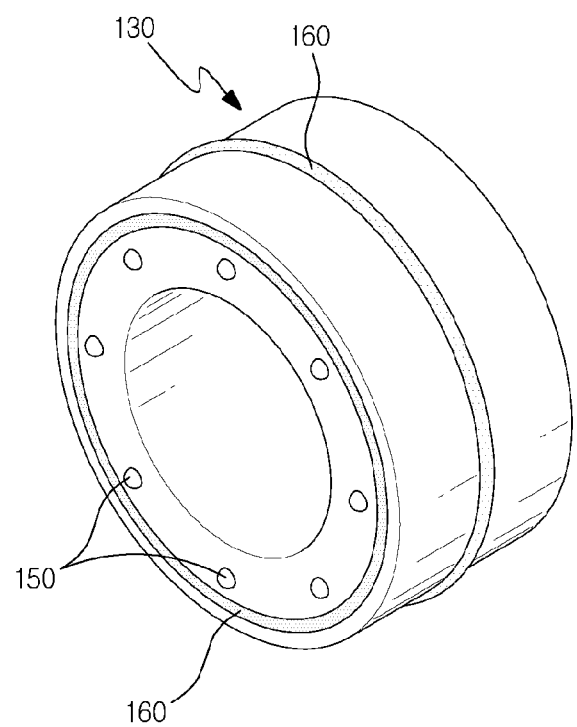
FIG. 3 is a perspective view of a fixing ring member of the sealing device according to the first example embodiment.
Figure 4:
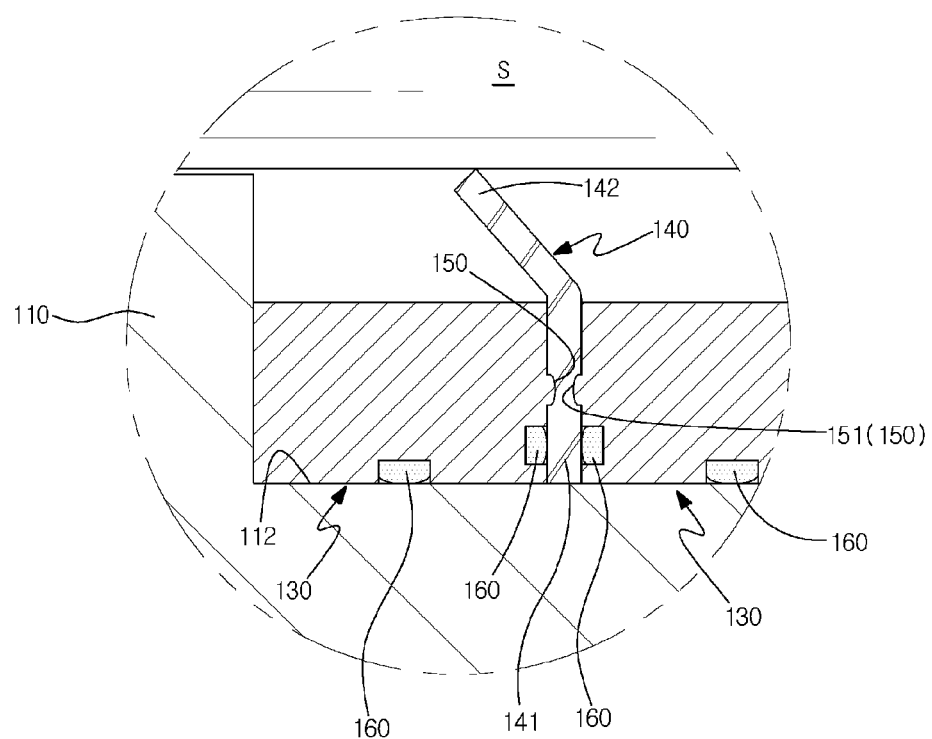
FIG. 4 is an enlarged view of an "A" portion of FIG. 2.

FIG. 2 is a cross-sectional view of a sealing device for a drive shaft according to the first example embodiment. FIG. 3 is a perspective view of a fixing ring member of the sealing device according to the first example embodiment. FIG. 4 is an enlarged view of an "A" portion of FIG. 2.

Referring to FIGS. 2 through 4, a sealing device 100 for a drive shaft S includes a housing 110, a sealing member 140, a fixing ring member 130, a fixing member 120, and a concavo-convex portion 150.

In general, a machine such as a stirrer, a reactor, and a mixer that is widely used in various fields including, for example, a petrochemical field, a fine chemical field, a medical field, a pharmaceutical field, and a food field, may include a drive shaft on which the machine rotates or straightly travels back and forth at a constant speed, and a portion of the drive shaft may include a sealing device, for example, the sealing device 100 as illustrated.

The sealing device 100 refers to a device to seal the drive shaft S while enabling a rotary motion or a straight reciprocating motion of the drive shaft S. The sealing device 100 may be disposed on an outer circumference of the drive shaft S to cover or surround a portion of the drive shaft S, or disposed on an outer circumference of a sleeve disposed in a portion of the drive shaft S to cover or surround the sleeve. The sleeve may be disposed in a cylindrical form on the outer circumference of the drive shaft S, and combined with the drive shaft S to rotate along with the drive shaft S. Hereinafter, descriptions of a sleeve will be omitted for convenience of description. However, the present disclosure is not limited to such an example, and thus the sleeve may be provided based on a condition and situation for designing a sealing device for a drive shaft.

The housing 110 is formed in a hollow cylindrical structure that covers an outer circumference of the drive shaft S. Thus, the housing 110 is provided to allow the drive shaft S to penetrate through a central portion of the housing 110.

That is, a through hole 111 is formed on one side of the housing 110 to allow the drive shaft S to rotate and straightly move, and an accommodating portion 140 having one open side into which the sealing member 140 and a portion of the fixing ring member 130 and the fixing member 120 are inserted is formed on the other side of the housing 110.

The fixing member 120 is provided to apply an axial pressure to the sealing member 140 and the fixing ring member 130 to be accommodated to the accommodating portion 140 of the housing 110, and combined with the housing 110 to allow one end portion to be inserted through an opening of the accommodating portion 140 of the housing 110. In the housing 110, the end portion of the fixing member 120 comes into contact with the fixing ring member 130. The fixing member 120 and the housing 110 are fastened together through a fastening member 121. By adjusting a fastening force of the fastening member 121, a pressure by which the end portion of the fixing member 120 is forcefully attached to the fixing ring member 130 may increase. That is, the fixing ring member 130 and the sealing member 140 are fixed between the housing 110 and the fixing member 120 by the fastening force of the fastening member 121.

The fixing ring member 130 is disposed in the accommodating portion 140 of the housing 110. The fixing ring member 130 is an element configured to fix the sealing member 140 in the housing 110. That is, a plurality of fixing ring members 130 is provided as the fixing ring member 130 and stacked in a longitudinal direction of the drive shaft S, and the sealing member 140 is disposed between the fixing ring members 130.

The sealing member 140 is an element to be sealed between the housing 110 and the drive shaft S. The sealing member 140 may be provided in various forms such as, for example, a mechanical seal, a lip seal, a radial shaft seal, an o-ring, an oil seal, a shaft seal, and a rubber ring. A plurality of sealing members 140 is provided as the sealing member 140, and the sealing members 140 are disposed between the housing 110 and the drive shaft S to be separate from each other in an axial direction of the drive shaft S. The sealing member 140 is described herein as a lip seal for convenience of description.

That is, the sealing member 140 is manufactured as a lip seal formed in a circular plate structure of which a center is penetrated. The sealing member 140 of such a type includes a fixing portion 141 and a lip seal portion 142.

The fixing portion 141 is disposed between the fixing ring members 130. Thus, the fixing portion 141 is fixed in the accommodating portion 140 of the housing 110 while being inserted between the fixing ring members 130. The fixing portion 141 is provided in a ring shape interposed between the fixing ring members 130.

The lip seal portion 142 is formed in a structure inclined and extended towards a surface of the drive shaft S in an inner circumferential portion of the fixing portion 141. That is, an inner circumferential end portion of the lip seal portion 142 comes into contact with the surface of the drive shaft S, and an outer circumferential end portion of the lip seal portion 142 is connected to the fixing portion 141. Thus, the lip seal portion 142 is formed in a ring shape of a circular plate. The lip seal portion 142 of such a type is formed of such a material as rubber or plastic. For example, the lip seal portion 142 may be formed of a polytetrafluoroethylene (PTFE) material such as Teflon, which may be desirable in terms of heat resistance, non-adhesiveness, insulation stability, and chemical stability, and a low friction coefficient.

The concavo-convex portion 150 is provided on at least one of contact surfaces on, or close surfaces from, which the fixing ring member 130 and the sealing member 140 face each other to increase a coupling force between the fixing ring member 130 and the sealing member 140. Although it is illustrated herein that the concavo-convex portion 150 is formed on a side of the fixing ring member 130, the concavo-convex portion 150 may also be formed on a side of the sealing member 140.

The concavo-convex portion 150 includes a pressurizer 151 disposed on a side surface of the fixing ring member 130. The pressurizer 151 protrudes from a surface on which the fixing ring member 130 and the sealing member 140 face each other, and is formed of a material having a relatively higher level of hardness compared to the sealing member 140, and a front end portion of the pressurizer 151 is provided in a pointed shape and. Thus, when a pressure is axially applied by the fixing member 120, the front end portion of the pressurizer 151 penetrates into a side surface of the sealing member 140 such that the sealing member 140 may be stably fixed.

In addition, to increase a force for fixing the sealing member 140, a plurality of concavo-convex portions 150 is provided, as the concavo-convex portion 150, on a side surface of the fixing ring member 130, and disposed separately from each other along a circumferential direction.

The pressurizer 151 may be integrally formed on the side surface of the fixing ring member 130 in a process of molding the fixing ring member 130. In addition, it is also possible to form the pressurizer 151 in a form of a burr by protruding a portion of the side surface of the fixing ring member 130 using a pressing device or an additional tool.

Here, a ring-shape o-ring or rubber ring is applied as a closing member 160, which is interposed between surfaces on which the fixing ring member 130 and the sealing member 140 face each other, to prevent a leak from a gap between the fixing ring member 130 and the sealing member 140. In addition, the closing member 160 is also interposed between surfaces on which the fixing ring member 130 and the housing 110 face each other to prevent a leak from a gap between an outer circumferential surface of the fixing ring member 130 and an inner circumferential surface of the accommodating portion 140 of the housing 110.

At a position on an outer side surface of the fixing ring member 130, which corresponds to the closing member 160, a seating groove in which a portion of the closing member 160 is accommodated is formed by being recessed to prevent an arbitrary movement of a position of the closing member 160.

When an axial pressure is applied to the fixing ring member 130 and the sealing member 140 by the fixing member 120, the closing member 160 interposed between the fixing ring member 130 and the sealing member 140 provides a frictional force between the fixing ring member 130 and the sealing member 140 to prevent an arbitrary rotation of the sealing member 140 by a rotational force of the drive shaft S. In addition, the closing member 160 interposed between the outer circumferential surface of the fixing ring member 130 and the inner circumferential surface of the accommodating portion 140 of the housing 110 provides a frictional force between the fixing ring member 130 and the housing 110 to prevent an arbitrary rotation of the fixing ring member 130 in the accommodating portion 140 of the housing 110 by a rotational force of the drive shaft S.

As described above, the closing member 160 may be used to prevent a leak between the corresponding members and improve sealability or sealing performance, and also prevent an arbitrary rotation of the sealing member 140 or the fixing ring member 130 by a rotational force of the drive shaft S by, providing a frictional force.

In particular, even in a case in which a gap is generated between the sealing member 140 and the fixing ring member 130 by the concavo-convex portion 150 used to improve a fixing force, the closing member 160 may prevent a fluid leakage through such a gap.

Thus, according to example embodiments of the present disclosure, using the concavo-convex portion 150 may improve a fixing force for the fixing ring member 130 and the sealing member 140 and stably fix a lip seal, and using the closing member 160 may prevent a fluid leakage through a gap between the fixing ring member 130 and the sealing member 140 and improve performance and reliability of a product.

Figure 5:
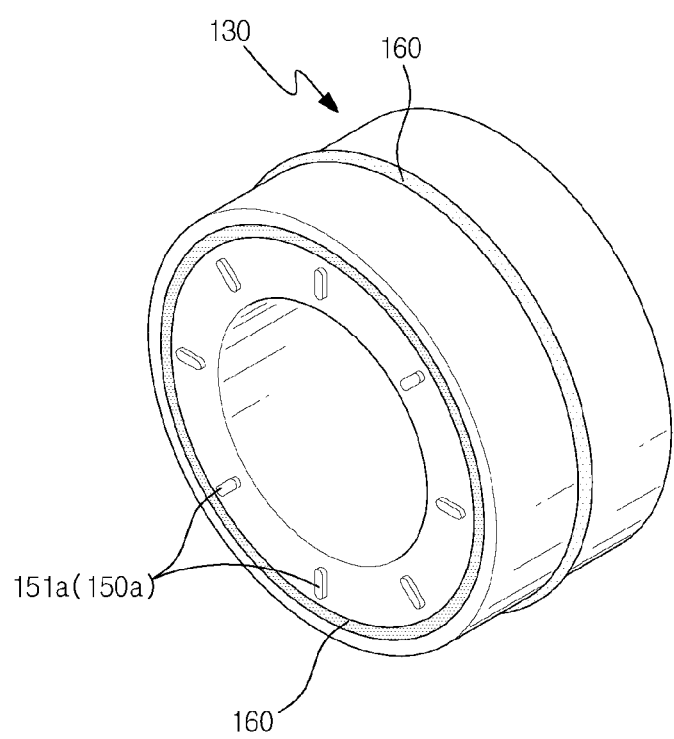
FIG. 5 is a perspective view of an example modification of the fixing ring member of the sealing device according to the first example embodiment.

FIG. 5 is a perspective view of an example modification of the fixing ring member 130 according to the first example embodiment.

Referring to FIG. 5, a concavo-convex portion 150a is extended radially from a center of the drive shaft S, for example, in a direction in which the pressurizer 151 crosses a rotation direction of the drive shaft S, by a predetermined length. Here, a plurality of concavo-convex portions 150a is provided as the concavo-convex portion 150a and disposed separately from each other along a circumferential direction on a side surface of the fixing ring member 130. Thus, the example modification illustrated here is different from the first example embodiment described above based on the preceding.

In such a case of using the concavo-convex portion 150a, an extension direction of a pressurizer 151a crosses the rotation direction of the drive shaft S when a front end portion of the pressurizer 151a penetrates into a side surface of the sealing member 140 from a contact surface between the fixing ring member 130 and the sealing member 140 and the sealing member 140 is being fixed accordingly, and thus a rotation of the sealing member 140 along with the drive shaft S may be effectively prevented.

Hereinafter, another example of a sealing device for a drive shaft will be described.

Figure 6:
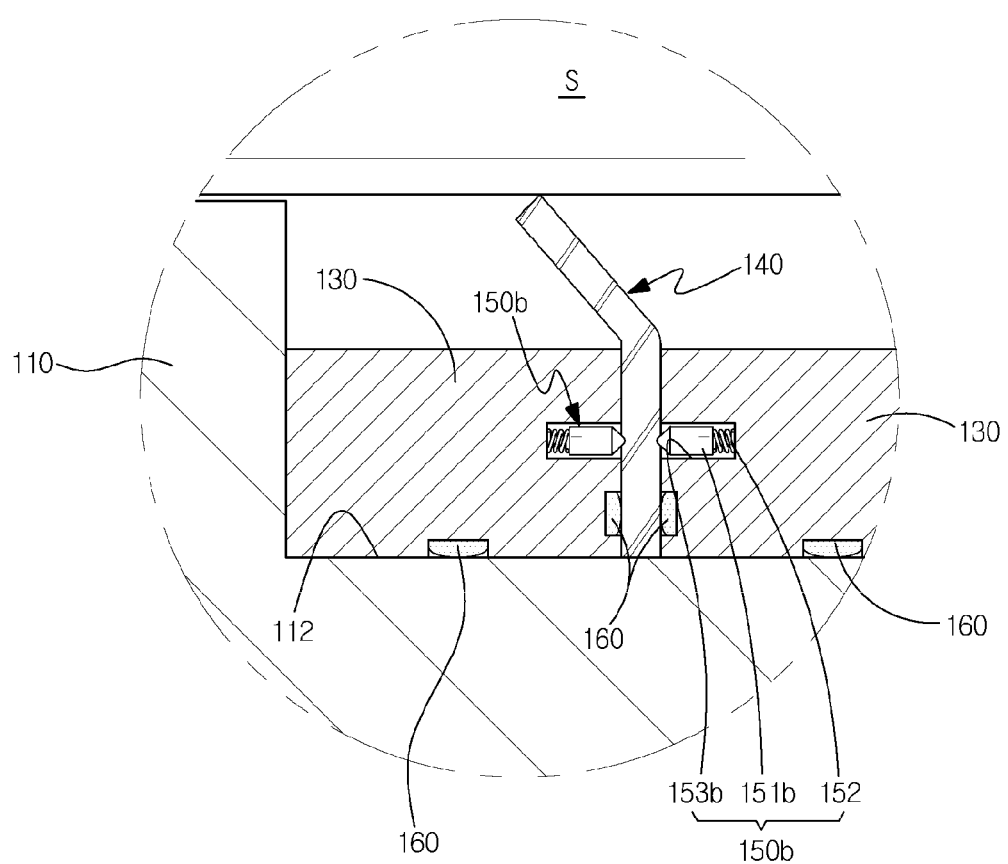
FIG. 6 is a diagram illustrating a sealing device for a drive shaft according to a second example embodiment.

FIG. 6 is a diagram illustrating a sealing device for a drive shaft according to a second example embodiment.

Referring to FIG. 6, the sealing device according to the second example embodiment is difference from one according to the first example embodiment described above in that a pressurizer 151b of a concavo-convex portion 150b is separated from the fixing ring member 130, and is elastically supported by an elastic member 152 towards a side of the sealing member 140.

In detail, the concavo-convex portion 150b includes the pin-type pressurizer 151b of which a rear end portion is supported by the fixing ring member 130 and a pointed front end portion is disposed facing towards the sealing member 140, a concavo-convex groove 153b formed on a side surface of the fixing ring member 130 facing the sealing member 140, and the elastic member 152 interposed between the concavo-convex groove 153b and the rear end portion of the pressurizer 151b and configured to elastically support the front end portion of the pressurizer 151b to proceed towards the sealing member 140.

Here, it may be desirable to form the concavo-convex groove 153b to have a shape corresponding to an end surface of the pressurizer 151b such that the pin-type pressurizer 151b moves while being inserted in the concavo-convex groove 153b.

According to the second example embodiment, when the fixing ring member 130 and the sealing member 140 are axially pressed by the fixing member 120 while the fixing ring member 130 and the sealing member 140 are being inserted in the accommodating portion 140 of the housing 110, surfaces on which the fixing ring member 130 and the sealing member 140 face each other may be closely attached by a pressure. Here, the pressurizer 151b of the concavo-convex portion 150b formed on the side surface of the fixing ring member 130 may penetrate into the side surface of the sealing member 140, and thus the sealing member 140 may be stably fixed.

Here, the pressurizer 151h is elastically supported by the elastic member 152 towards the sealing member 140, and thus a damage to the sealing member 140 that may occur while the front end portion of the pressurizer 151b is penetrating into the sealing member 140 and the sealing member 140 is being fixed accordingly may be prevented.

Figure 7:
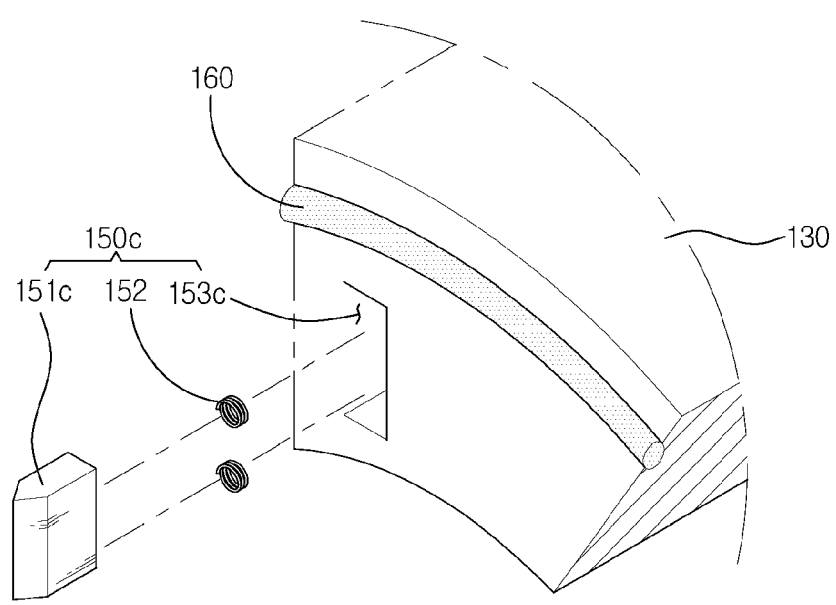
FIGS. 7 and 8 are diagrams illustrating an example modification of the sealing device according to the second example embodiment.
Figure 8:
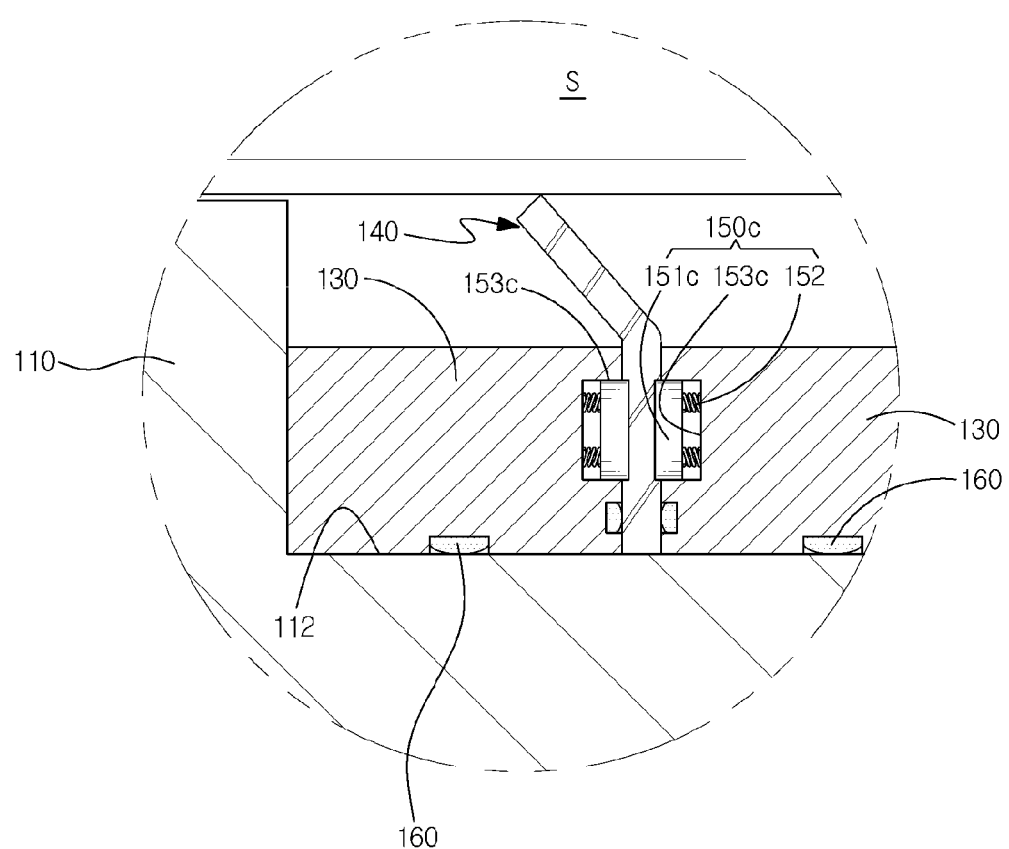

FIGS. 7 and 8 are diagrams illustrating an example modification of the sealing device according to the second example embodiment.

Referring to FIGS. 7 and 8, the example modification is different from the second example embodiment described above in that a pressurizer 151c of a concavo-convex portion 150c is radially extended from a center of the drive shaft S, for example, in a direction crossing a rotation direction of the drive shaft S. Here, a plurality of pressurizers 151c is provided as the pressurizer 151c and disposed separately from each other along a circumferential direction on a side surface of the fixing ring member 130.

Here, it may be desirable to form a concavo-convex groove 153c formed on the fixing ring member 130 to have a shape corresponding to an end surface of the radial pressurizer 151c such that the pressurizer 151c axially moves while being inserted in the concavo-convex groove 153c. In addition, it is possible to dispose a plurality of elastic members 152, or plate-type springs, at a rear end portion of the pressurizer 151c such that the radial pressurizer 151c applies an elastic force uniformly or evenly towards the sealing member 140.

In such a case of using the concavo-convex portion 150c, an extension direction of the pressurizer 151c crosses a rotation direction of the drive shaft S while a front end portion of the pressurizer 151c is penetrating into the side surface of the sealing member 140 and the sealing member 140 is being fixed accordingly, and thus an effect of preventing an arbitrary rotation of the sealing member 140 by a rotation of the drive shaft S may be improved.

Hereinafter, still another example of a sealing device for a drive shaft will be described.

Figure 9:
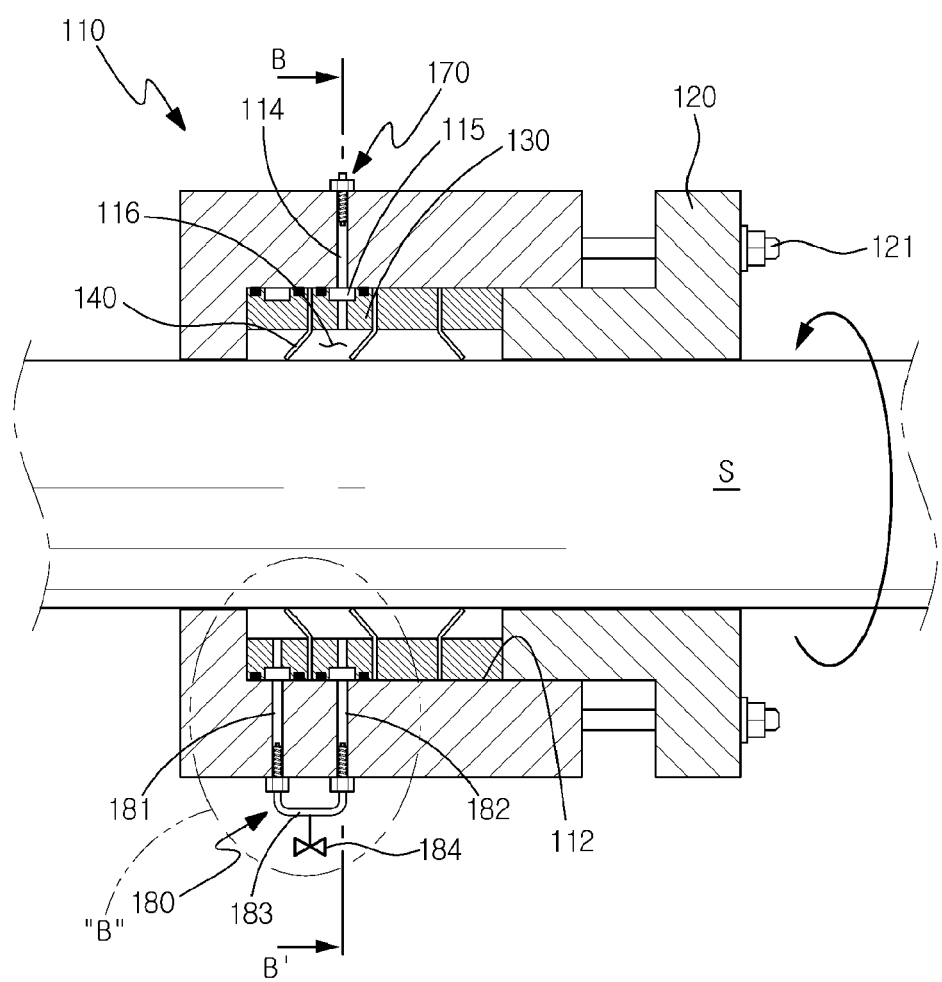
FIG. 9 is a cross-sectional view of a sealing device for a drive shaft according to a third example embodiment.
Figure 10:
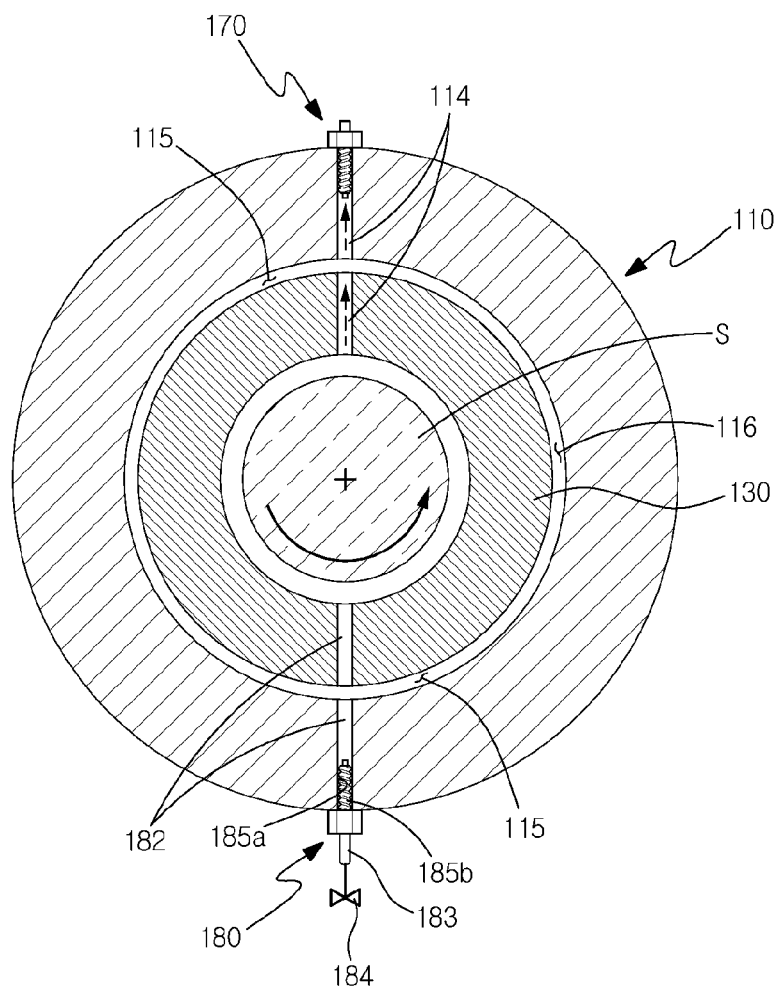
FIG. 10 is a cross-sectional view obtained by cutting FIG. 9 along a B-B' line.

FIG. 9 is a cross-sectional view of a sealing device for a drive shaft according to a third example embodiment. FIG. 10 is a cross-sectional view obtained by cutting FIG. 9 along a B-B' line, and FIG. 11 is an enlarged view of a "B" portion of FIG. 9.

Figure 11:
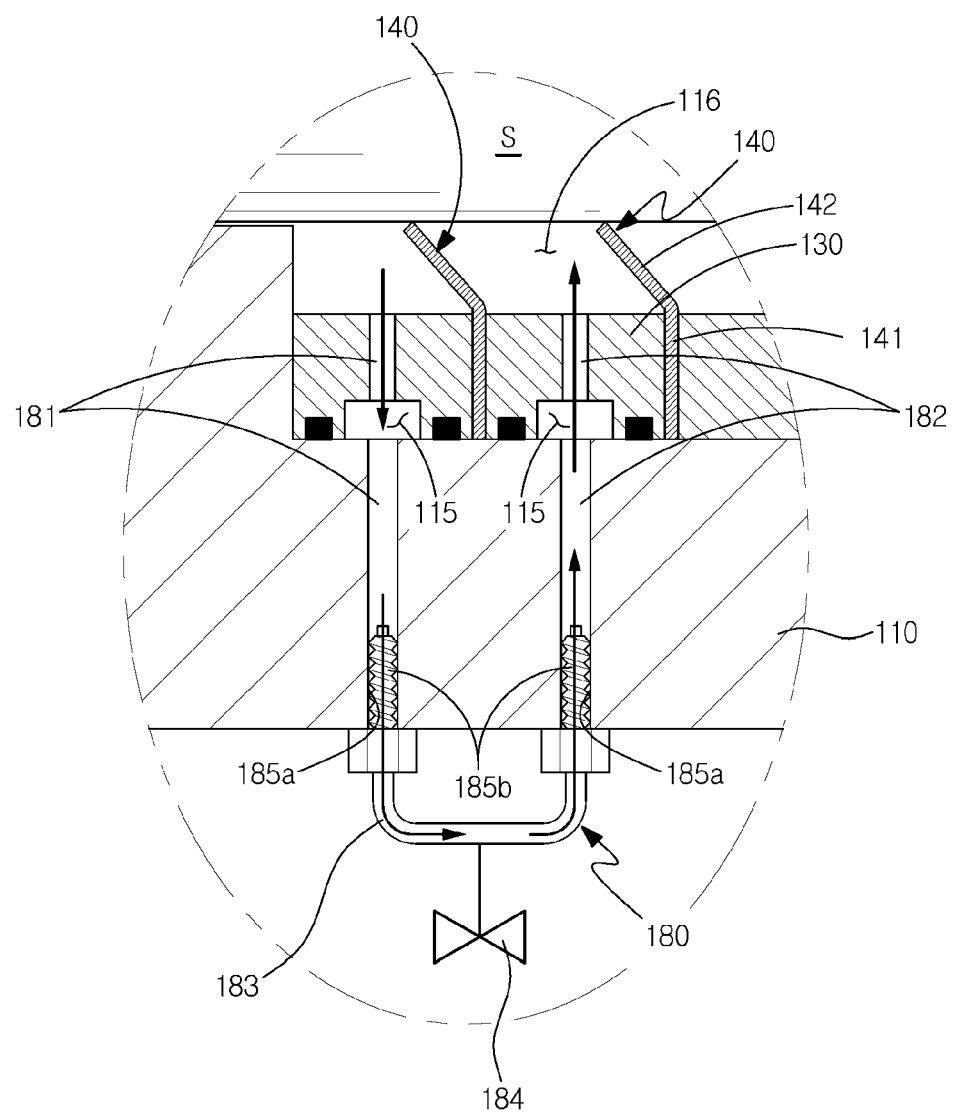
FIG. 11 is an enlarged view of a "B" portion of FIG. 9.

Referring to FIGS. 9 through 11, the sealing device according to the third example embodiment includes a main body, a leak detection unit 170 installed in the main body and configured to detect a leak from the main body, and a bypass passage 180 used to detect whether the leak detection unit 170 operates normally.

In general, a machine such as a stirrer, a reactor, and a mixer that is widely used in various technical fields including, for example, a petrochemical field, a fine chemical field, a medical field, a pharmaceutical field, and a food field may include a drive shaft on which the machine rotates or straightly travels back and forth at a constant speed, and a portion of the drive shaft may include a sealing device for the drive shaft.

The sealing device refers to a device to seal a drive shaft S to allow the drive shaft S to be still capable of performing a rotary motion or a straight reciprocating motion after the sealing. The sealing device may be disposed on an outer circumference of the drive shaft S to cover or surround a portion of the drive shaft S, or disposed on an outer circumference of a sleeve disposed in a portion of the drive shaft S to cover or surround the sleeve. The sleeve may be disposed in a cylindrical form on the outer circumference of the drive shaft s, and combined with the drive shaft S to rotate along with the drive shaft S. Hereinafter, descriptions of a sleeve will be omitted here for convenience of description. However, the present disclosure is not limited to such an example, and thus the sleeve may be provided based on a condition and situation for designing a sealing device for a drive shaft.

The main body is a device to seal a periphery of the drive shaft S. The main body is provided in a structure that surrounds a circumference of the drive shaft S. For example, the main body includes a housing 110, a fixing member 120, and a sealing member 140, as illustrated.

The housing 110 and the fixing member 120 are formed in a hollow cylindrical structure that covers an outer circumference of the drive shaft S. Thus, the housing 110 is disposed to allow the drive shaft S to penetrate through a central portion of the housing 110.

The housing 110 is formed in a cylindrical structure that covers the outer circumference of the drive shaft S. Here, a through hole is formed on one side of the housing 110 to allow the drive shaft S to rotate and straightly move. An accommodating portion 112 having one opening into which the sealing member 140 and the fixing ring member 130 and a portion of the fixing member 120 are inserted is formed on the other side of the housing 110.

The fixing ring member 130 is disposed in the accommodating portion 112 of the housing 110. The fixing ring member 130 is an element configured to fix the sealing member 140 into the housing 110. That is, a plurality of fixing ring members 130 is provided as the fixing ring member 130 and stacked in a longitudinal direction of the drive shaft S, and the sealing member 140 is disposed between the fixing ring members 130.

The fixing member 120 is combined with the housing 110 to allow one end portion thereof to be inserted into the accommodating portion 112 of the housing 110. In the housing 110, the end portion of the fixing member 120 comes into contact with the fixing ring member 130. In addition, the fixing member 120 and the housing 110 are fastened together through a fastening member 121. By adjusting a fastening force of the fastening member 121, a pressure by which the end portion of the fixing member 120 forcefully presses the fixing ring member 130 may be adjusted. That is, the fixing ring member 130 and the sealing member 140 are fixed, firmly and stably, between the housing 110 and the fixing member 120 by the fastening force of the fastening member 121.

The sealing member 140 is an element provided to seal a gap between the housing 110 and the drive shaft S. The sealing member 140 may be provided in various forms such as, for example, a mechanical seal, a lip seal, a radial shaft seal, an o-ring, an oil seal, a shaft seal, and a rubber ring. A plurality of sealing members 140 is provided as the sealing member 140 and disposed between the housing 110 and the drive shaft S to be separate from each other in an axial direction of the drive shaft S. Hereinafter, the sealing member 140 will be described as a lip seal for convenience of description.

The sealing member 140 is manufactured as a lip seal formed in a circular plate structure of which a center is penetrated. The sealing member 140 of such a structure includes a fixing portion 141 and a lip seal portion 142.

The fixing portion 141 is disposed between the fixing ring members 130. Thus, the fixing portion 141 is fixed in the housing 110 while being inserted between the fixing ring members 130. The fixing portion 141 is provided in a ring type interposed between the fixing ring members 130.

The lip seal portion 142 is formed in a structure inclined and extended towards a surface of the drive shaft S in an inner circumferential portion of the fixing portion 141. That is, an inner circumferential end portion of the lip seal portion 142 comes into contact with the surface of the drive shaft S, and thus an outer circumferential end portion of the lip seal portion 142 is connected to the fixing portion 141. Thus, the lip seal portion 142 is formed in a ring shape of a circular plate. The lip seal portion 142 of such a type is formed of such a material as rubber or plastic. For example, the lip seal portion 142 may be formed of a PTFE material, for example, Teflon, that has an excellent heat resistance, non-adhesiveness, insulation stability, and chemical stability, and a low friction coefficient.

In addition, a closed space 116 is formed between the sealing members 140. The closed space 116 refers to a space defined by an outer circumferential surface of the drive shaft S, side surfaces of two sealing members 140 disposed adjacent to each other, and an inner circumferential surface of the fixing ring member 130. Here, similar to the sealing member 140, a plurality of closed spaces 116 is provided as the closed space 116 and disposed in an axial direction of the drive shaft S.

The leak detection unit 170 refers to a device configured to detect a leak through the sealing member 140, and is disposed in the closed space 116. That is, the leak detection unit 170 is disposed between the sealing members 140.

As described above, the closed spaces 116 are disposed separately from each other in a longitudinal direction of the drive shaft S. Here, the leak detection unit 170 is disposed in at least one of the closed spaces 116. Hereinafter, it will be described that the leak detection unit 170 is disposed in one of the closed spaces 116.

In the housing 110, a detection hole 114 formed to be connected to the closed space 116 is provided. The leak detection unit 170 is installed inside or outside the detection hole 114. That is, the leak detection unit 170 is installed in the detection hole 114, or in an element or portion externally extended from the detection hole 114. The element or portion externally extended from the detection hole 114 may include, for example, a pipe or a tube of which one end portion is connected to the housing 110 to be connected to the detection hole 114. Hereinafter, it will be described that the leak detection unit 170 is disposed inside the detection hole 114.

The detection hole 114 is formed to penetrate through the housing 110. Thus, a first end portion of the detection hole 114 is connected to an outside of the housing 110, and a second end portion of the detection hole 114 is connected to the closed space 116.

In particular, an extended space 115 connected to the detection hole 114 is formed, along an edge of the fixing ring member 130, at a position of the outer circumferential surface of the fixing ring member 130 that corresponds to the detection hole 114, and is provided in a form of a ring-type concavo-convex groove. In addition, a width of the extended space 115 may be desirably greater than a diameter of the detection hole 114. Thus, although the detection hole 114 formed in the housing 110 and the detection hole 114 formed in the fixing ring member 130 are not disposed on the same axis in a process of assembling the housing 110 and the fixing ring member 130, a fluid may flow through the extended space 115 for the detection hole 114 on both sides, and thus convenience in assembling the fixing ring member 130 may be improved.

In addition, on both sides of the extended space 115 formed in the fixing ring member 130, a ring-type closing member such as an o-ring is provided. The closing member is closely attached to the outer circumferential surface of the fixing ring member 130 and the inner circumferential surface of the housing 110, and thus prevents an external fluid from flowing into the extended space 115 through an assembled surface of the fixing ring member 130 and the housing 110 or prevents a fluid in the extended space 115 from externally leaking.

Here, the extended space 115 of such a concavo-convex groove type, which is formed on the outer circumferential surface of the fixing ring member 130, is described above as an example. However, it is possible to form the extended space 115 by forming a concavo-convex groove at a position of the inner circumferential surface of the housing 110 that corresponds to the detection hole 114, or forming a concavo-convex groove on each of the inner circumferential surface of the fixing ring member 130 and the inner circumferential surface of the housing 110.

The bypass passage 180 connects an internal space and the closed space 116 such that a fluid in the internal space that is sealed by the sealing device moves to the closed space 116 in which the leak detection unit 170 is disposed.

The bypass passage 180 includes a first passage 181 formed in the housing 110 to connect the internal space and the outer circumferential surface of the housing 110, a second passage 182 formed in the housing 110 to connect the outer circumferential surface of the housing 110 and the closed space 116 in which the leak detection unit 170 is disposed, and a third passage 183 provided in a form of a pipe connecting the first passage 181 and the second passage 182 outside the housing 110, and an opening and closing member 184 installed in the third passage 183 and configured to selectively open and close the third passage 183.

In addition connectors 185a and 185b are detachably connected to open portions of the first passage 181 and the second passage 182, and both end portions of the third passage 183.

In detail, the connector 185a formed on the open portions of the first passage 181 and the second passage 182 includes an internal thread (female) portion, and the connector 185b formed on both end portions of the third passage 183 includes an external thread (male) portion to be connected to the internal thread portion. In addition, the connector 185b of the third passage 183 includes a head portion to rotate the external thread portion.

As described above, the first passage 181 and the second passage 182 are formed to penetrate into the housing 110 and the fixing ring member 130. Thus, a first end portion on which the connector 185a of the first passage 181 and the second passage 182 is formed is connected to the outside of the housing 110, and a second end portion of the first passage 181 and the second passage 182 is connected to the closed space 116.

In particular, since the extended space 115 is formed on the outer circumferential surface of the fixing ring member 130, it may not need to dispose, on the same axial line, the first passage 181 and the second passage 182 formed in the housing 110 and the fixing ring member 130 in a process of inserting the fixing ring member 130 into the accommodating portion 112 of the housing 110. In addition, since the extended space 115 is connected to the inside closed space 116 by the detection hole 114, it is possible to form the second passage 182 to connect the outer circumferential surface of the housing 110 and the extended space 115.

The opening and closing member 184 is installed in the third passage 183 and used to selectively open or close the third passage 183, and a general-type electric or manual valve may be used as the opening and closing member 184 to open or close the third passage 183.

Hereinafter, operations of the sealing device according to the third example embodiment will be described.

In the sealing device according to the third example embodiment, when the third passage 183 is opened using the opening and closing member 184 of the bypass passage 180, in a state in which the main body of the sealing device is installed in a test device (not shown) configured to supply a target fluid to be detected to the internal space, the fluid of the internal space moves to the closed space 116 in which the leak detection unit 170 is installed via the first passage 181 and the third passage 183, and the second passage 182 of the bypass passage 180.

Here, when the leak detection unit 170 installed in the detection hole 114 connected to the closed space 116 detects the fluid moved to the closed space 116, the leak detection unit 170 outputs a fluid detection signal, and thus whether the leak detection unit 170 operates normally is verified. That is, whether the leak detection unit 170 operates normally may be detected by selectively supplying the target fluid for leak detection to the closed space 116 in which the leak detection unit 170 is disposed from the internal space sealed by the sealing member 140, using the bypass passage 180.

Thus, in a state in which the leak detection unit 170 is installed in the sealing device, by detecting whether the leak detection unit 170 operates normally without disassembling the sealing member 140 or causing damage to the sealing member 140 to conduct a test on the leak detection unit 170, it is possible to perform a full inspection on the sealing device. Therefore, a leakage accident that may occur due to a detect in a product may be prevented, and reliability of the product may be improved accordingly.

Figure 12:
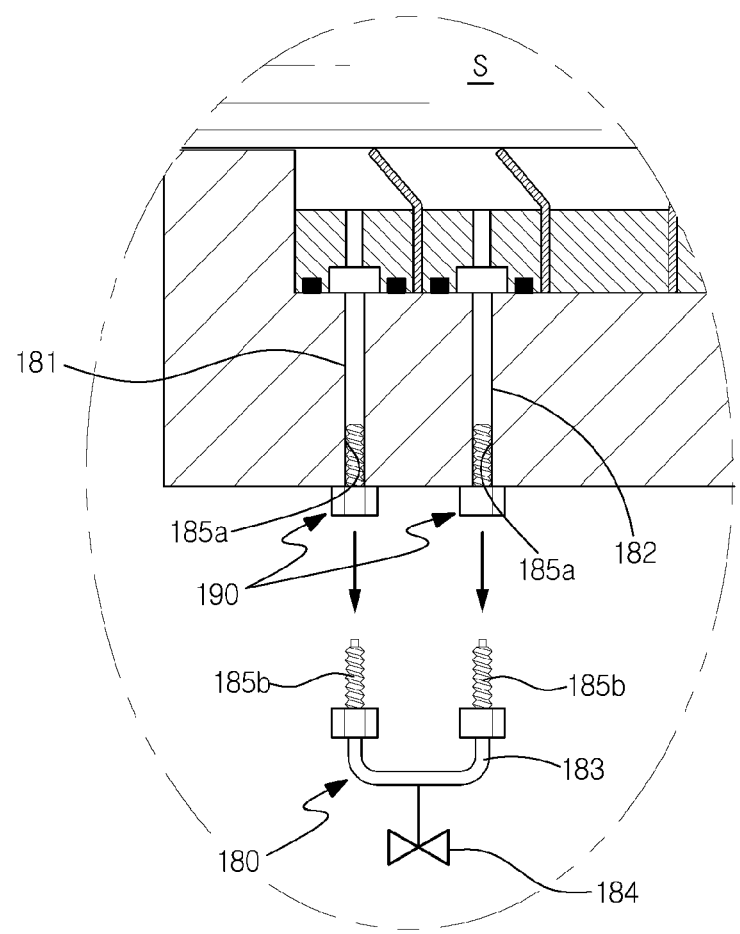
FIG. 12 is a cross-sectional view illustrating a state in which a third passage is removed after an inspection of a leak detection unit of the sealing device according to the third example embodiment.

FIG. 12 is a cross-sectional view illustrating a state in which a third passage is removed after an inspection of a leak detection unit of the sealing device according to the third example embodiment.

As illustrated in FIG. 12, after whether the leak detection unit 170 operates normally is verified using the bypass passage 180, the third passage 183 is separated from the first passage 181 and the second passage 182 formed in the housing 110, and the open portions of the first passage 181 and the second passage 182 are closed using a closing cap 190. Thus, a fluid leakage through the first passage 181 and the second passage 182 is prevented during use of the sealing device.

The closing cap 190 is provided in a form of a bolt-type stopper that may be coupled to the connector 185a of the first passage 181 and the second passage 182. That is, the closing cap 190 includes a fastener provided with an external thread portion and a hexagonal head portion. Here, one end portion of the fastener is inserted into the first end portion of the detection hole 114. The one end portion of the fastener and the connector 185a of the first passage 181 and the second passage 182 may be hermetically coupled together through a screw fastening method. In addition, the head portion is connected to the other end portion of the fastener, and disposed outside the housing 110, That is, it is convenient to rotate the fastener by adjusting the head portion. For example, for a screw fastening operation of the fastener, the head portion is formed in a hexagonal shape to be connected to a wrench.

Figure 13:
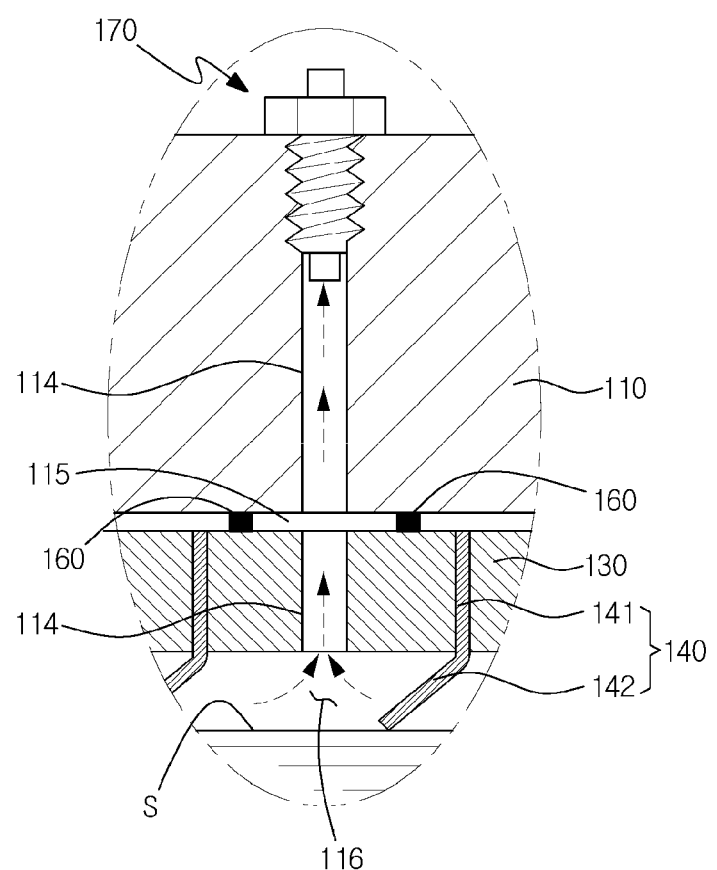
FIG. 13 is a diagram illustrating an example modification of the sealing device according to the third example embodiment.

FIG. 13 is a diagram illustrating an example modification of the sealing device according to the third example embodiment. FIG. 13 illustrates an example modification of the sealing device illustrated in FIGS. 9 through 12.

Referring to FIG. 13, the extended space 115 of the sealing device is disposed on the inner circumferential surface of the housing 110, the outer circumferential surface of the fixing ring member 130, and each of both sides of the detection hole 114, and defined by the ring-type closing member 160 closely attached to each of the housing 110 and the fixing ring member 130.

Although the extended space 115 is illustrated as a form of a ring-type concavo-convex groove in FIGS. 9 through 12, it is possible to form the extended space 115 by the ring-type closing member 160 disposed on both sides of the detection hole 114 on the outer circumferential surface of the fixing ring member 130 as shown in FIG. 5.

By forming the extended space 115 by the ring-type closing member 160, it may not need to additionally process the ring-type concavo-convex groove between the housing 110 and the fixing ring member 130 as illustrated in FIGS. 9 through 12, and it is possible to prevent a leakage through a contact surface between the housing 110 and the fixing ring member 130.

Hereinafter, yet another example of a sealing device for a drive shaft will be described.

Figure 14:
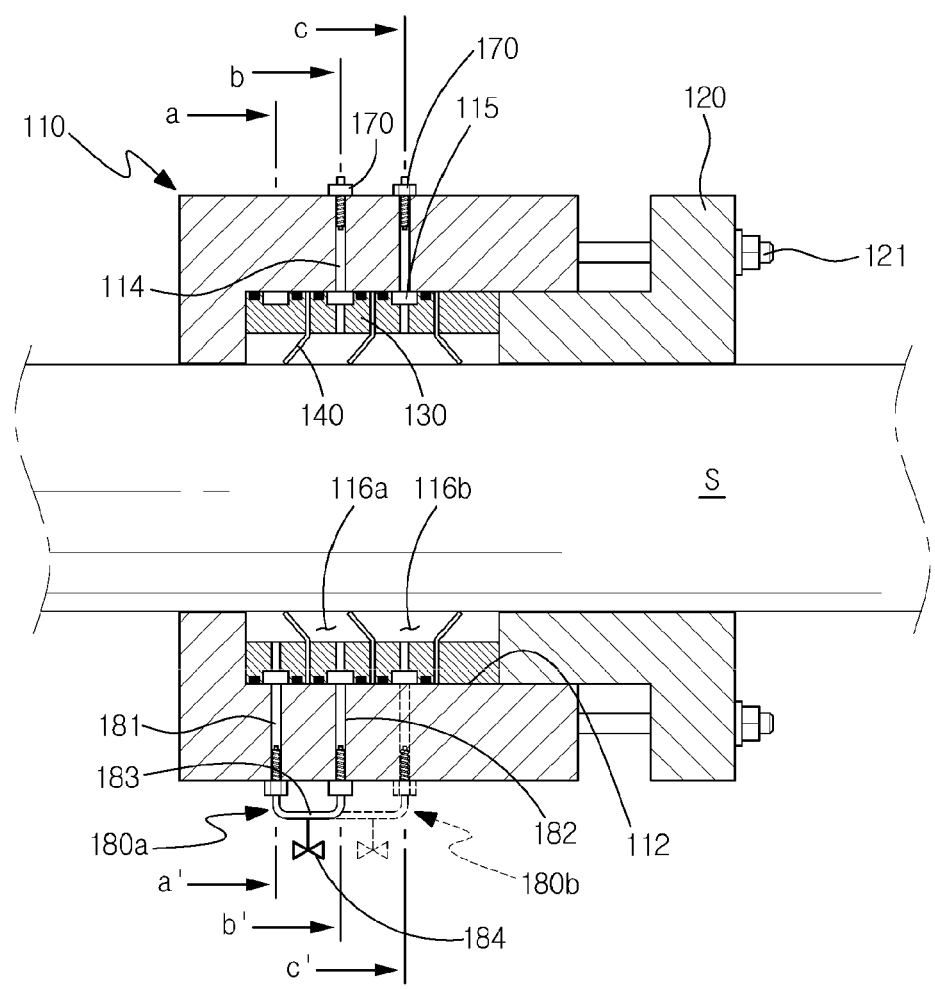
FIG. 14 is a cross-sectional view of a sealing device for a drive shaft according to a fourth example embodiment.
Figure 15:
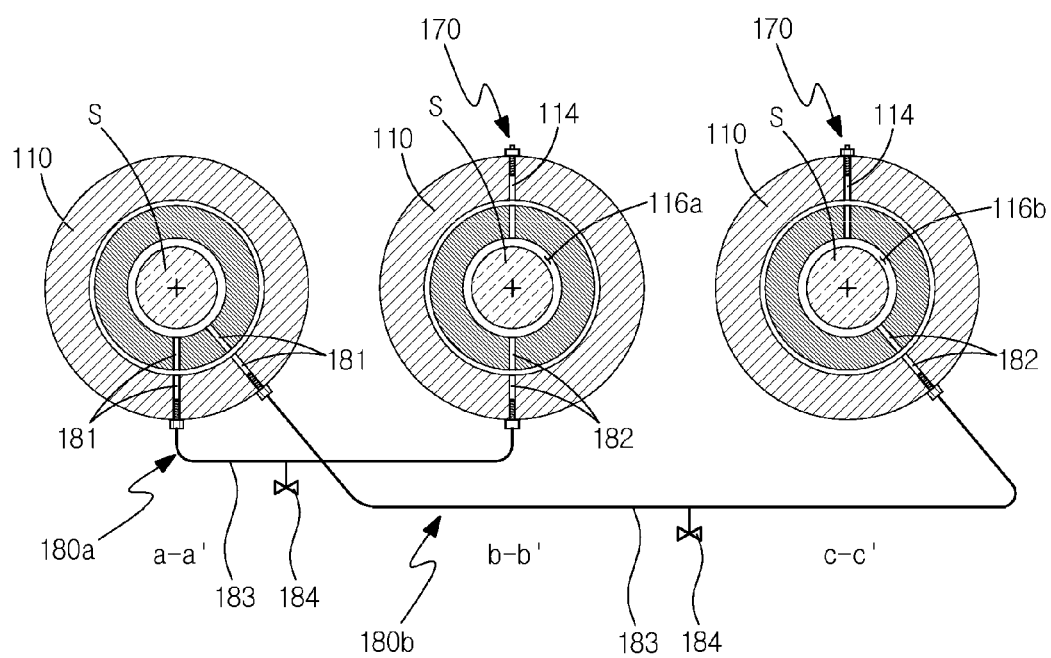
FIG. 15 is a conceptual diagram illustrating a bypass passage of the sealing device according to the fourth example embodiment.

FIG. 14 is a cross-sectional view of a sealing device for a drive shaft according to a fourth example embodiment. FIG. 15 is a conceptual diagram illustrating a bypass passage of the sealing device according to the fourth example embodiment.

Referring to FIGS. 14 and 15, the sealing device according to the fourth example embodiment is different from the sealing device according to the first example embodiment described above in that a plurality of closed spaces 116 is provided as the closed space 116, and a plurality of bypass passages 180 is provided as the bypass passage 180 to connect the internal space sealed by the main body of the sealing device and a closed space 116 in which the leak detection unit 170 is disposed among the plurality of closed spaces 116.

As illustrated, the leak detection unit 170 is disposed in each of two closed spaces 116, and two bypass passages 180 connect the internal space sealed by the main body of the sealing device and the closed spaces 116 in which the leak detection unit 170 is disposed, respectively. Here, for convenience of description, one of the closed spaces 116 is referred to as a first closed space 116a and the other of the closed spaces 116 is referred to as a second closed space 116b. In addition, one of the bypass passages 180 that connects the internal space and the first closed space 116a is referred to as a first bypass passage 180a and the other of the bypass passages 180 that connects the internal space and the second closed space 116h is referred to as a second bypass passage 180b.

Each of the first bypass passage 180a and the second bypass passage 180b includes a first passage 181, a second passage 182, a third passage 183, and an opening and closing member 184. Here, to prevent an overlap of positions of the first passage 181, the first bypass passage 180a and the second bypass passage 180b are disposed separately from each other from a center of the drive shaft S in a circumferential direction.

That is, as illustrated in FIG. 15, by opening the opening and closing member 184 of the first bypass passage 180a, whether the leak detection unit 170 installed in the first closed space 116a operates normally is verified. Similarly, by opening the opening and closing member 184 of the second bypass passage 180b, whether the leak detection unit 170 installed in the second closed space 116b operates normally is verified.

As described above, by supplying a target fluid for leak detection to each of the closed spaces 116 in which the leak detection unit 170 is installed using the plurality of bypass passages 180, it is possible to inspect all of the plurality of leak detection units 170 installed in the main body of the sealing device, and it is thus possible to improve a product reliability accordingly.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

INDUSTRIAL AVAILABILITY

According to example embodiments described herein, a sealing device for a drive shaft may firmly fix a sealing member and prevent an arbitrary movement of the sealing member, and thus improve sealability or sealing performance. In addition, whether a leak detection unit operates normally may be verified by using a bypass passage that bypasses the sealing member.

I claim:

1. A sealing device for a drive shaft, the sealing device comprising:
a housing disposed to cover the drive shaft between an internal space and an external space;
a plurality of sealing members disposed separately from each other between the housing and the drive shaft in an axial direction to be sealed between the housing and the drive shaft;
a plurality of fixing ring members disposed alternately with the plurality of sealing members such that one of the plurality of fixing ring members is interposed between two of the plurality of sealing members to maintain an interval between the two of the plurality of sealing members, wherein each of the plurality of sealing members includes a retention portion positioned axially between adjacent fixing ring members;
a closing member positioned on each side of each of the plurality of sealing members that abut each sealing member axially and that are located in axial facing grooves on the plurality of fixing ring members; and
a fixing member to be fixed to the housing to apply an axial pressure to the plurality of sealing members and the fixing ring member,
wherein a pressurizer seal is formed on at least one surface of the fixing ring member positioned to correspond to a matching recess in one of the plurality of sealing members.

2. The sealing device of claim 1, wherein the pressurizer seal includes a pressurizer of which a rear end portion is supported by at least one of the plurality of fixing ring members or one of the plurality of sealing members, and a front end portion is disposed to face the other one of the plurality of fixing ring members and one of the plurality of sealing members.

3. The sealing device of claim 2, wherein the at least one of the plurality of fixing ring members or one of the plurality of sealing members by which the rear end portion of the pressurizer is supported includes the matching recess to accommodate the rear end portion of the pressurizer.

4. The sealing device of claim 3, wherein the pressurizer seal includes an elastic member disposed in the matching recess to elastically support the rear end portion of the pressurizer.

5. The sealing device of claim 2, wherein the pressurizer is integrated with the at least one of the plurality of fixing ring members or one of the plurality of sealing members by which the rear end portion of the pressurizer is supported to be an integral form.

6. The sealing device of claim 1, wherein the pressurizer seal is extended in a direction crossing a rotation direction of the drive shaft, and is provided as a plurality of pressurizer seals disposed separately from each other in a circumferential direction.

7. The sealing device of claim 1, wherein each fixing ring has an additional closing member interposed in a surface on which the plurality of fixing ring members and the housing face each other.

8. The sealing device of claim 7, wherein each closing member is a ring and is located in a respective seating groove of the plurality of fixing ring members.

* * * * *